United States Patent
Lv et al.

(10) Patent No.: US 10,040,984 B1
(45) Date of Patent: Aug. 7, 2018

(54) WATER-BASED DRILLING FLUID FOR PROTECTING HIGH-PERMEABILITY RESERVOIRS, AND PREPARATION METHOD AND USE THEREOF

(71) Applicant: China University of Petroleum (East China), Qingdao (CN)

(72) Inventors: Kaihe Lv, Qingdao (CN); Jinsheng Sun, Qingdao (CN); Jingping Liu, Qingdao (CN)

(73) Assignee: China University of Petroleum (East China) (CN)

( * ) Notice: Subject to any disclaimer, the term of this patent is extended or adjusted under 35 U.S.C. 154(b) by 0 days.

(21) Appl. No.: 15/809,707

(22) Filed: Nov. 10, 2017

(30) Foreign Application Priority Data

Jan. 22, 2017 (CN) .......................... 2017 1 0053248

(51) Int. Cl.
| | | |
|---|---|---|
| *E21B 33/13* | (2006.01) | |
| *C09K 8/035* | (2006.01) | |
| *C09K 8/04* | (2006.01) | |
| *C09K 8/24* | (2006.01) | |
| *C09K 8/20* | (2006.01) | |
| *E21B 21/00* | (2006.01) | |

(52) U.S. Cl.
CPC ................ *C09K 8/24* (2013.01); *C09K 8/203* (2013.01); *E21B 21/003* (2013.01); *C09K 2208/08* (2013.01)

(58) Field of Classification Search
CPC ....... E21B 21/003; E21B 33/13; C09K 8/035; C09K 8/04
See application file for complete search history.

(56) References Cited

U.S. PATENT DOCUMENTS

| | | | | | |
|---|---|---|---|---|---|
| 3,833,345 | A | * | 9/1974 | Tatsuke .................. | C10L 1/143 44/339 |
| 7,934,557 | B2 | * | 5/2011 | Nguyen ................. | C09K 8/502 166/285 |
| 9,267,068 | B1 | * | 2/2016 | Jiang ........................ | C09K 8/03 |

FOREIGN PATENT DOCUMENTS

| | | |
|---|---|---|
| CN | 103013467 A | 4/2013 |
| CN | 103555301 A | 2/2014 |
| CN | 104277803 A | 1/2015 |
| CN | 105713583 A | 6/2016 |

* cited by examiner

*Primary Examiner* — Catherine Loikith
(74) *Attorney, Agent, or Firm* — Calfee, Halter & Grisowld LLP

(57) ABSTRACT

Disclosed herein are water-based drilling fluids for protecting high-permeability reservoirs. The drilling fluid comprises bentonite, a tackifier, a thinner, a filtrate reducer, an anti-collapse agent, a reservoir protectant, a lubricant, and water.

15 Claims, 1 Drawing Sheet

Reservoir      Wellbore

Reservoir                Wellbore

WATER-BASED DRILLING FLUID FOR PROTECTING HIGH-PERMEABILITY RESERVOIRS, AND PREPARATION METHOD AND USE THEREOF

RELATED APPLICATIONS

This application is a continuation of and claims priority to Chinese Patent Application No. 201710053248.8, filed on Jan. 22, 2017, which is incorporated herein in its entirety.

FIELD OF THE INVENTION

The present invention relates to the technical field of petroleum drilling, in particular to a water-based drilling fluid for protecting high-permeability reservoirs, a method for preparing the water-based drilling fluid, and use of the water-based drilling fluid.

BACKGROUND OF THE INVENTION

Usually, the permeability of a high-permeability reservoir is 500 md or higher. For high-permeability reservoirs, owing to the high permeability, the liquid phase and solid granules in the drilling fluid can enter into the voids and pore throats of the reservoirs more easily, resulting in severely decreased permeability; in addition, also owing to the high permeability, the drilling fluid will infiltrate into the reservoir more deeply, causing damages such as clay swelling, dispersed migration, and water blocking, etc., in a greater scope and seriously impact on the output of oil and gas wells. Such reservoir damages have aroused high concern in the petroleum industry at domestic and overseas. Both domestic and overseas have conducted a long-term research on reservoir protective drilling fluid techniques, a shielding temporary plugging technique for reservoir protection and drilling fluid systems based on that technique were developed, and in the subsequent steps, fractal geometry-based temporary plugging technique, D90 ideal temporary plugging technique, broad-spectrum temporary plugging technique, and associated drilling fluid systems were developed. However, existing drilling fluids can't attain a satisfactory protective effect for high-permeability or super-high-permeability reservoirs. The main reason for the poor protection effect lies in that all of the above-mentioned reservoir protection techniques require the rigid granules of temporary plugging agent to enter into the interior of the pores and plug the pores by bridging. To attain a good shielding temporary plugging effect, the dimensions of the bridging granules must match the pore diameter appropriately. Therefore, ascertaining the pore diameter distribute characteristic of the reservoir accurately is prerequisite and crucial to successful implementation of the existing temporary plugging techniques. However, owing to the heterogeneous characteristic of reservoirs, it is difficult to accurately master the characteristics of reservoir pores; consequently, the temporary plugging effect is often unsatisfactory, and the temporary plugging success ratio is very low. Moreover, even if the temporary plugging material attains a good temporary plugging effect for the reservoir, the temporary plugging layer will block the oil and gas flow from entering into the well bore in the time of blocking the drilling fluid from entering into the reservoir. Consequently, plug removal work is required after the drilling is completed, resulting in increased operation cost. Hence, there is an urgent need for developing an innovative water-based drilling fluid, which is suitable for high-permeability reservoirs, and has strong plugging capability, and can flow back easily, to overcome the drawbacks of the existing reservoir protective drilling fluid techniques.

SUMMARY OF THE INVENTION

To overcome the above-mentioned drawbacks in the existing techniques in the prior art, the present invention provides a water-based drilling fluid for protecting high-permeability reservoirs, an method for preparing the water-based drilling fluid, and use of the water-based drilling fluid.

To attain the above-mentioned object, in a first aspect, the present invention provides a water-based drilling fluid, which comprises: optional bentonite, a tackifier, an optional diluent, a filtrate reducer, an optional anti-collapse agent, a reservoir protectant, an optional lubricant, and water, wherein, the reservoir protectant an intermediate product, an alkali, a salt, and water, and, based on 100 pbw (Parts By Weight) of the reservoir protectant, the dose of the intermediate product is 5-40 pbw, the dose of the alkali is 1-10 pbw, and the dose of the salt is 1-12 pbw, wherein, the intermediate product is prepared from raw materials including acrylamide, a cationic monomer, a cross-linker, an initiator, a toughener, and water, and, based on 100 pbw of the raw materials, the dose of the acrylamide is 8-30 pbw, the dose of the cationic monomer is 1-10 pbw, the dose of the cross-linker is 0.01-0.5 pbw, the dose of the initiator is 0.01-0.1 pbw, and the dose of the toughener is 5-25 pbw.

In a second aspect, the present invention provides a method for preparing the above water-based drilling fluid, comprising: mixing optional bentonite, the tackifier, the optional diluent, the filtrate reducer, the optional anti-collapse agent, the reservoir protectant, the optional lubricant, and water homogeneously.

In a third aspect, the present invention provides a use of the water-based drilling fluid disclosed in the present invention in high-permeability reservoir drilling.

Compared with the prior art, the water-based drilling fluid provided in the present invention attains the following outstanding effects:

(1) Outstanding High-Permeability Reservoir Protection Effect

Figure 1:
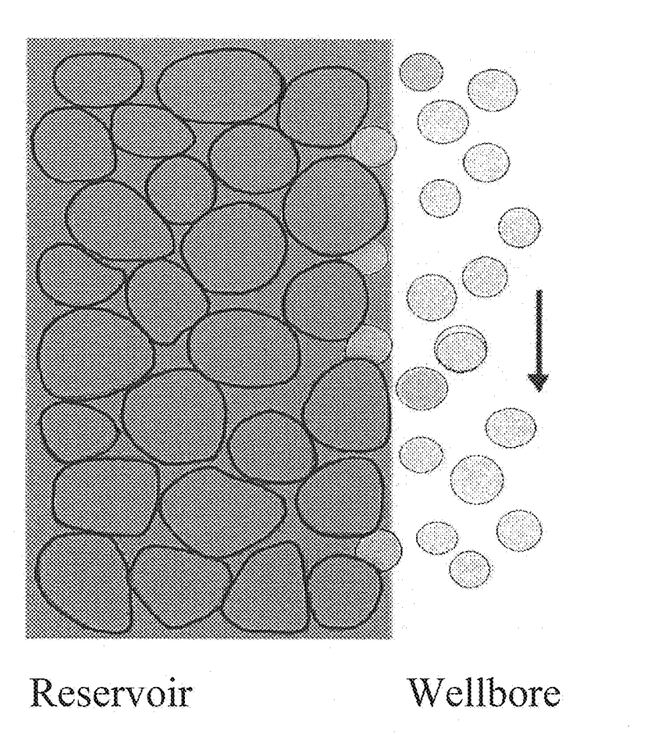
FIG. 1 is a schematic diagram of embedded plugging of the reservoir protectant (the polymer elastic granule) in the water-based drilling fluid according to the present invention.

The water-based drilling fluid in the present invention contains polymeric elastic granules that serve as a reservoir protectant, and thereby overcomes the drawbacks in the existing temporary plugging techniques. The polymeric elastic granule material has the following obvious advantages:

① High plugging speed and high plugging success ratio: the polymeric elastic granules are elastic granules that are in irregular shapes, deformable, and durable, and have high elasticity and toughness; when the diameter of the polymeric elastic granules is greater than the diameter of the pores, under pressure difference, the elastic granules can be embedded in the pore entries in part and seal the pores, while the remaining part is still outside of the pores and attains a plugging effect (see FIG. 1). Furthermore, the polymeric elastic granules are highly adaptive to pores with entries in different shapes, thus overcome the drawback of poor adaptability of rigid granules owing to lack of deformation capability, and can plug the pore quickly, achieve a high success rate for temporary plugging, and attain an purpose of blocking the drilling fluid from further intruding into the reservoir.

② Unidirectional plugging, without plug removal: The polymeric elastic granules are embedded in the entries of the pore rather than enter into the interior of the pore, and the embedded plugging layer can be removed easily provided that there is counter pressure difference. Therefore, no special plug remove measure is required when a polymer elastic granule is used for temporary plugging, the plug will be removed automatically under drawdown pressure (negative pressure difference) after well completion, and the original permeability of the reservoir will be recovered; thus, the oil well productivity will not be affected, and plug removal work is not required.

③ Wide temperature and degree of mineralization applicability: the polymeric elastic granules exist stably within a temperature range of room temperature to 200° C. temperature, have high thermostability, and are suitable to reservoirs with different depths; the polymeric elastic granules can be used in hypersalinity brine drilling fluids because degree of mineralization has little influence on the properties of the polymeric elastic granules.

Accordingly, the water-based drilling fluid provided in the present invention is especially suitable to high-permeability reservoir protection, and has the following characteristics in reservoir protection:

① The water-based drilling fluid provided in the present invention has a high plugging success ratio and an excellent plugging effect. Existing common shielded temporary plugging techniques require that calcium carbonate or other rigid particles enter into the pore to bridge, and the size of the bridging particles must strictly match the diameter of the pores; otherwise the bridging can't effectively produce a plugging effect. Owing to the heterogeneous characteristic of the reservoir, usually it is difficult to accurately ascertain the width distribution of the reservoir pores; in such a case, the size of the bridging particles is selected blindly, and the temporary plugging effect is poor, as well as the success ratio is reduced. The water-based drilling fluid provided in the present invention requires that the size of the polymeric elastic granules is greater than the diameter of the pores; in the case that the width distribution of the reservoir pore can't be ascertained, granules in a larger size can be selected to ensure an embedded temporary plugging effect; and has a universal plugging performance. Therefore, in the case that the width distribution of the reservoir pore is known or unknown, the water-based drilling fluid provided in the present invention always can attain a good plugging effect; in contrast, existing shielded temporary plugging techniques can attain a good plugging effect only if the width distribution of the reservoir pore is known.

② No plug removal work, lower operation cost. The protecting layer formed by the water-based drilling fluid of the present invention mainly exists at the surface of the well wall or at the entries of the pores rather than inside the reservoir pores. Therefore, no additional plug removal work is required when the water-based drilling fluid provided in the present invention is used; the plug can be removed under the counter pressure difference produced in the downhole after the drilling is completed.

(2) High Temperature-Resistance, Suitable for Deep Well Drilling and Ultra-Deep Well Drilling According to a preferred embodiment of the present invention, all of the major treating agents contained in the water-based drilling fluid provided in the present invention, including sulfonate copolymer DSP-2, sulfomethylated lignite resin SPNH, organic amine shale inhibitor AP-2, polyether polyol SYP-2 and reservoir protectant, etc., have a good temperature-resistant property. Therefore, the water-based drilling fluid provided in the present invention can be resistant to high temperature up to 200° C. or above, and can be used in deep wells and extra-deep wells.

(3) High Lubrication Property, Suitable for Highly-Deviated Wells, Directional Wells, and Horizontal Wells According to a preferred embodiment of the present invention, the water-based drilling fluid provided in the present invention contains polyether polyol SYP-2, which has a good lubrication property; in addition, the organic amine shale inhibitor AP-2 that serves as an anti-collapse agent in the water-based drilling fluid also has a good lubrication property. Therefore, the water-based drilling fluid provided in the present invention has an outstanding lubrication property, can effectively reduce friction resistance and torque generated as a result of rotation of the drilling tool during the drilling process, and is suitable for highly-deviated wells, directional wells, and horizontal wells.

(4) Simple Formulation, Quick Preparation

The drilling fluid has a relatively simple formulation, can be prepared easily and quickly, and has a low overall cost.

(5) Helpful for Environmental Protection

All of the additives are nontoxic and easy to biodegrade, have little impact on sensitive regions, and are helpful for environmental protection.

Other features and advantages of the present invention will be further detailed in the embodiments hereunder.

DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. In the FIGURES.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a water-based drilling fluid, which comprises: optional bentonite, a tackifier, an optional diluent, a filtrate reducer, an optional anti-collapse agent, a reservoir protectant, an optional lubricant, and water, wherein, the reservoir protectant comprises an intermediate product, an alkali, a salt, and water, and, based on 100 pbw of the reservoir protectant, the dose of the intermediate product is 5-40 pbw, the dose of the alkali is 1-10 pbw, and the dose of the salt is 1-12 pbw, wherein, the intermediate product is prepared from raw materials including acrylamide, a cationic monomer, a cross-linker, an initiator, a toughener, and water, and, based on 100 pbw of the raw materials, the dose of the acrylamide is 8-30 pbw, the dose of the cationic monomer is 1-10 pbw, the dose of the cross-linker is 0.01-0.5 pbw, the dose of the initiator is 0.01-0.1 pbw, and the dose of the toughener is 5-25 pbw.

For the water-based drilling fluid provided in the present invention, to further improve the reservoir protection capability of the drilling fluid, preferably, based on 100 pbw of the raw materials, the dose of the acrylamide is 10-25 pbw, the dose of the cationic monomer is 2-5 pbw, the dose of the cross-linker is 0.01-0.05 pbw, the dose of the initiator is 0.02-0.05 pbw, and the dose of the toughener is 8-15 pbw. Those skilled in the art should understand that the dose of water in the above raw materials meets a criterion that the sum parts by weight (pbw) of all constituents constituting the raw materials is 100.

For the water-based drilling fluid provided in the present invention, preferably, the cationic monomer is a quaternary ammonium compound, further preferably is at least one of dimethyldiallyl ammonium halide (e.g., dimethyldiallyl ammonium chloride, dimethyldiallyl ammonium bromide), methacryloyloxyethyl-trimethyl ammonium halide (e.g., methacryloyloxyethyl-trimethyl ammonium chloride, methacryloyloxyethyl-trimethyl ammonium bromide), acryloyloxyethyl-trimethyl ammonium halide (e.g., acryloyloxyethyl-trimethyl ammonium chloride, acryloyloxyethyl-trimethyl ammonium bromide), alkyldimethylbenzyl ammonium halide, and alkyltrimethyl ammonium halide; still further preferably, the alkyl in the alkyldimethylbenzyl ammonium halide is C8-C20 alkyl (e.g., dodecyldimethylbenzyl ammonium chloride, hexadecyldimethylbenzyl ammonium bromide, octodecyldimethylbenzyl ammonium chloride), the alkyl in the alkyltrimethyl ammonium halide is C8-C20 alkyl (e.g., dodecyltrimethyl ammonium chloride, hexadecyltrimethyl ammonium bromide, octodecyltrimethyl ammonium chloride).

For the water-based drilling fluid provided in the present invention, there is no particular limitation for the cross-linker; in other words, the cross-linker may be any cross-linker commonly used in the art; preferably, the cross-linker is at least one of N, N'-methylene-bis acrylamide, divinyl benzene, and glutaraldehyde.

For the water-based drilling fluid provided in the present invention, there is no particular limitation for the initiator; in other words, the initiator may be any initiator commonly used in the art; preferably, the initiator is persulfate, more preferably is at least one of ammonium persulfate, potassium persulfate, and sodium persulfate.

For the water-based drilling fluid provided in the present invention, there is no particular limitation for the toughener; in other words, the toughener may be any toughener commonly used in the art; preferably, the toughener is starch and/or bentonite.

For the water-based drilling fluid provided in the present invention, preferably, the method for preparing the intermediate product of the reservoir protectant comprise: mixing the acrylamide, the cationic monomer, the cross-linker, the toughener and water, adding the initiator into the resultant mixture for initiating reaction, and then drying and pulverizing the reaction product.

Preferably, the method for mixing the acrylamide, the cationic monomer, the cross-linker, the toughener, and water are mixed comprises: (1) dissolving the acrylamide, the cationic monomer and the cross-linker in water and stirring to a homogeneous state; (2) adding the toughener into the mixture obtained in the step (1), and stirring to a homogenous state; (3) stirring the mixture obtained in the step (2) in a protective atmosphere. Wherein, the protective atmosphere may be nitrogen and/or an inert gas, and the stirring time in the step (3) may be 20-30 min.

Preferably, the reaction conditions include: temperature: 30-60° C., time: 3-5 h. The supply of the protective gas and the stirring can be stopped after the reaction.

Preferably, the drying conditions include: temperature: 50-150° C., time: 10-24 h.

In the present invention, there is no particular limitation for the granularity of the product obtained by pulverization; reservoir protectant (i.e., the polymer elastic granule) produced from the product obtained by pulverization may be in diameter greater than the diameter of pores of the reservoir, according to the diameter of pore of the applicable reservoir.

In the water-based drilling fluid in the present invention, to further improve the reservoir protection capability of the drilling fluid, preferably, based on 100 pbw reservoir protectant, the dose of the intermediate product is 10-30 pbw, the dose of the alkali is 2-5 pbw, and the dose of the salt is 5-10 pbw. Those skilled in the art should understand that in the reservoir protectant above, the dose of water meets a criterion that the sum of the parts by weight (pbw) of all constituents of the reservoir protectant is 100.

For the water-based drilling fluid provided in the present invention, there is no particular limitation for the alkali; in other words, the alkali may be any alkali commonly used in the art; preferably, the alkali is at least one of sodium hydroxide, potassium hydroxide, sodium carbonate, potassium carbonate, sodium bicarbonate, and potassium bicarbonate.

For the water-based drilling fluid provided in the present invention, there is no particular limitation for the salt; in other words, the salt may be any salt commonly used in the art; preferably, the salt is at least one of sodium chloride, potassium chloride, calcium chloride, sodium formate, potassium formate, and cesium formate.

For the water-based drilling fluid provided in the present invention, preferably, the reservoir protectant further comprises a bactericide, and, based on 100 pbw reservoir protectant, the dose of the bactericide is 0.03-2 pbw, preferably is 0.05-1 pbw.

Wherein, preferably, the bactericide is an absorptive bactericide, further preferably is at least one of alkyltrimethyl ammonium halide, alkylpyridinium halide, and alkyldimethylbenzyl ammonium halide. Still further preferably, the alkyl in the alkyltrimethyl ammonium halide is C8-C20 alkyl (e.g., dodecyltrimethyl ammonium chloride, hexadecyltrimethyl ammonium bromide, octodecyltrimethyl ammonium chloride), the alkyl in the alkylpyridinium halide is C8-C20 alkyl (e.g., dodecylpyridinium chloride, hexadecylpyridinium chloride, octodecylpyridinium bromide), the alkyl in the alkyldimethylbenzyl ammonium halide is C8-C20 alkyl (e.g., dodecyldimethylbenzyl ammonium chloride, hexadecyldimethylbenzyl ammonium bromide, octodecyldimethylbenzyl ammonium chloride).

For the water-based drilling fluid provided in the present invention, preferably, the method for preparing the reservoir protectant comprise: mixing the intermediate product of the reservoir protectant, the alkali, the salt, optional bactericide, and water.

In the present invention, preferably, the mixing method comprises: first, mixing the intermediate product of the reservoir protectant, the alkali, and water (while stirring for 5-20 h), and then mixing the resultant mixture with the salt and the optional bactericide (while stirring for 0.5-2 h); or The mixing method comprises: first, mixing the intermediate product of the reservoir protectant, the alkali, optional bactericide, and water (while stirring for 5-20 h), and then mixing the resultant mixture with the salt (while stirring for 0.5-2 h). Those skilled in the art should understand: in the method for preparing the reservoir protectant, the "optional" bactericide refers to that the bactericide is added in an corresponding amount in the preparation process if the reservoir protectant contains the bactericide, while an corresponding amount of the bactericide doesn't have to be added if the reservoir protectant doesn't contain the bactericide.

In the water-based drilling fluid provided in the present invention, the doses of the constituents in the water-based drilling fluid may be selected according to the specific application scenario, wherein, the modifier "optional" for a constituent refers to that the constituent should be added in an corresponding amount in the preparation process of the water-based drilling fluid if the water-based drilling fluid contains that constituent, or an corresponding amount of the constituent doesn't have to be added in the preparation process if the water-based drilling fluid doesn't contain that constituent. Whether the constituents should be added or not in different application scenarios is well known to those skilled in the art, and will not be further detailed here.

In the water-based drilling fluid provided in the present invention, preferably, based on 100 ml water-based drilling fluid, the dose of the bentonite is 0-4 g, further preferably is 1-3 g.

In the water-based drilling fluid provided in the present invention, preferably, based on 100 ml water-based drilling fluid, the dose of the tackifier is 0.2-2 g, further preferably is 0.5-1 g.

In the water-based drilling fluid provided in the present invention, preferably, based on 100 ml water-based drilling fluid, the dose of the diluent is 0.5-2 g, further preferably is 0.5-1 g.

In the water-based drilling fluid provided in the present invention, preferably, based on 100 ml water-based drilling fluid, the dose of the filtrate reducer is 1.5-7 g, further preferably is 2.5-5 g.

In the water-based drilling fluid provided in the present invention, preferably, based on 100 ml water-based drilling fluid, the dose of the anti-collapse agent is 0-3 g, further preferably is 1-2 g.

In the water-based drilling fluid provided in the present invention, preferably, based on 100 ml water-based drilling fluid, the dose of the reservoir protectant is 1-5 g, further preferably is 2-4 g.

In the water-based drilling fluid provided in the present invention, preferably, based on 100 ml water-based drilling fluid, the dose of the lubricant is 0-5 g, further preferably is 2-3 g.

In the water-based drilling fluid provided in the present invention, the bentonite refers to clay with montmorillonite as the main mineral component, which can render viscous shearing force, filter loss control and wall building capability to the drilling fluid; for example, the bentonite may be sodium bentonite and/or calcium bentonite, preferably is sodium bentonite.

In the water-based drilling fluid provided in the present invention, the tackifier can improve the viscous shearing force of the drilling fluid; for example, the tackifier may be at least one of sulfonate copolymer (e.g., DSP-2), potassium polyacrylamide (KPAM), polyanionic cellulose (e.g., PAC141, PAC-HV), xanthan gum (XC), sodium carboxymethylcellulose (Na-CMC), and polyacrylamide (PAM), preferably is sulfonate copolymer (e.g., DSP-2).

In the water-based drilling fluid provided in the present invention, the diluent have effects of reducing the viscosity of the drilling fluid, adjusting the flow pattern of the drilling fluid, and improving the shear-thinning property of the drilling fluid; for example, the diluent may be an zwitterionic polymer viscosity reducer (e.g., XY-27) and/or sulfonated sodium tannin (SMT), preferably is sulfonated sodium tannin (SMT).

In the water-based drilling fluid provided in the present invention, the filtrate reducer can improve the filter loss control and wall building capability of the drilling fluid; for example, the filtrate reducer may be at least one of sulfomethylated phenolic resin (e.g., SMP-I, SMP-II), lignite resin (e.g., KFT), sulfomethylated lignite resin (e.g., SPNH), modified starch, temperature-resistant and salinity-resistant filtrate reducer (e.g., LY-1), and zwitterionic polymer (e.g., JT-888), preferably is sulfomethylated lignite resin (e.g., SPNH) and/or temperature-resistant and salinity-resistant filtrate reducer (e.g., LY-1).

In the water-based drilling fluid provided in the present invention, the anti-collapse agent can prevent well wall collapse and improve well wall stability; for example, the anti-collapse agent may be at least one of organic amine shale inhibitor (e.g., AP-2), potassium humate (KHM), organic silicon (e.g., GF-1), and modified asphalt (e.g., FT-1), preferably is organic amine shale inhibitor (e.g., AP-2).

In the water-based drilling fluid provided in the present invention, the lubricant can improve the lubrication property of the drilling fluid, reduce friction resistance and torque and thereby reduce the risk of jamming of the drilling tool in the drilling process; for example, the lubricant may be at least one of graphite, mineral oil, vegetable oil, plastic beads, and polyether glycol (e.g., SYP-2), preferably is polyether glycol (e.g., SYP-2).

In the water-based drilling fluid provided in the present invention, all of the constituents described above can be commercially available.

According to a preferred embodiment, the water-based drilling fluid provided in the present invention contains sodium bentonite, sulfonate copolymer (e.g., DSP-2), sulfonated sodium tannin, sulfomethylated lignite resin (e.g., SPNH), temperature-resistant and salinity-resistant filtrate reducer (e.g., LY-1), organic amine shale inhibitor (e.g., AP-2), polyether glycol (e.g., SYP-2), reservoir protectant, and water, and, based on 100 ml water-based drilling fluid, the dose of the sodium bentonite is 0-4 g, preferably is 1-3 g; the dose of the sulfonate copolymer (e.g., DSP-2) is 0.2-2 g, preferably is 0.5-1 g; the dose of the sulfonated sodium tannin is 0.5-2 g, preferably is 0.5-1 g; the dose of the sulfomethylated lignite resin (e.g., SPNH) is 1-5 g, preferably is 2-4 g; the dose of the temperature-resistant and salinity-resistant filtrate reducer (e.g., LY-1) is 0.5-2 g, preferably is 0.5-1 g; the dose of the organic amine shale inhibitor (e.g., AP-2) is 0-3 g, preferably is 1-2 g; the dose of the polyether glycol (e.g., SYP-2) is 0-5 g, preferably is 2-3 g; the dose of the reservoir protectant is 1-5 g, preferably is 2-4 g.

In a second aspect, the present invention provides a method for preparing the water-based drilling fluid described above, comprising: mixing optional bentonite, a tackifier, an optional diluent, a filtrate reducer, an optional anti-collapse agent, a reservoir protectant, an optional lubricant, and water homogeneously.

preferably, the method comprises: mixing bentonite, a tackifier, a diluent, a filtrate reducer, an anti-collapse agent, a reservoir protectant, a lubricant, and water homogeneously, wherein, the mixing method comprises: mixing bentonite and water (while stirring for 1-5 h); then, after 18-36 h, adding a tackifier into the system and stirring (till the tackifier is dissolved fully); and then adding a filtrate reducer, an anti-collapse agent, a lubricant, a diluent, and a reservoir protectant, and stirring for 20-40 min. There is no particular limitation for the sequence in which the filtrate reducer, anti-collapse agent, lubricant, diluent, and reservoir protectant are added, that is to day, those constitutes may be added in any sequence.

In the method disclosed in the present invention, the selection of the types and doses of the bentonite, tackifier, diluent, filtrate reducer, anti-collapse agent, reservoir protectant, and lubricant has been described in the above content, and will not be further detailed here.

In a third aspect, the present invention provides the use of the water-based drilling fluid disclosed in the present invention in high-permeability reservoir drilling. Preferably, the permeability of the high-permeability reservoir is 500 md or higher.

EXAMPLES

Hereunder the present invention will be detailed in some examples, but it should be noted that the present invention are not limited to those examples. In the following preparation examples, examples, and comparative examples, unless otherwise specified, all of the materials are commercially available, and all of the methods are conventional methods in the art.

Preparation Example 1

This preparation example is provided here to describe the preparation method of the polymer elastic granule of the reservoir protectant.

20 kg acrylamide, 4 kg dimethyldiallyl ammonium chloride and 0.01 kg N, N'-methylene-bis acrylamide are dissolved fully in 67.96 kg water, and then 8 kg sodium bentonite is added into the solution, and the mixture is stirred to a homogeneous state. The above-mentioned reaction liquid is loaded into a reactor equipped with a stirrer, a condenser tube and a thermometer, nitrogen is supplied for protection, the reaction liquid is stirred for 20 min., and then the temperature is adjusted to 60° C., 0.03 kg ammonium persulfate is added, the nitrogen supply and the stirring are stopped, and the reaction liquid is held for 3 h for reaction; the reaction product is taken out, dried for 15 h at 105° C., and pulverized to obtain a granular intermediate product of reservoir protectant.

10 kg intermediate product and 5 kg sodium carbonate are added into 79.95 kg water and the liquid is stirred continuously for 10 h, then 5 kg sodium chloride and 0.05 kg octodecyltrimethyl ammonium chloride are added, and the liquid is stirred further for 0.5 h; thus, a polymer elastic granule of the reservoir protectant A1 is obtained.

Preparation Example 2

This preparation example is provided here to describe the preparation method of the polymer elastic granule of the reservoir protectant.

25 kg acrylamide, 5 kg methacryloyloxyethyl-trimethyl ammonium chloride and 0.02 kg N, N'-methylene-bis acrylamide are dissolved fully in 59.93 kg water, and then 10 kg starch is added into the solution, and the mixture is stirred to a homogeneous state. The above-mentioned reaction liquid is loaded into a reactor equipped with a stirrer, a condenser tube and a thermometer, nitrogen is supplied for protection, the reaction liquid is stirred for 30 min., and then the temperature is adjusted to 50° C., 0.05 kg potassium persulfate is added, the nitrogen supply and the stirring are stopped, and the reaction liquid is held for 4 h for reaction; the reaction product is taken out, dried for 12 h at 110° C., and pulverized to obtain a granular intermediate product of reservoir protectant.

20 kg intermediate product, 3 kg potassium hydroxide, and 0.3 kg hexadecylpyridinium chloride are added into 69.7 kg water and the liquid is stirred continuously for 10 h, then 7 kg potassium chloride is added, and the liquid is stirred further for 1 h; thus, a polymer elastic granule of the reservoir protectant A2 is obtained.

Preparation Example 3

This preparation example is provided here to describe the preparation method of the polymer elastic granule of the reservoir protectant.

10 kg acrylamide, 2 kg dodecyldimethylbenzyl ammonium chloride and 0.05 kg N, N'-methylene-bis acrylamide are dissolved fully in 72.93 kg water, and then 15 kg sodium bentonite is added into the solution, and the mixture is stirred to a homogeneous state. The above-mentioned reaction liquid is loaded into a reactor equipped with a stirrer, a condenser tube and a thermometer, nitrogen is supplied for protection, the reaction liquid is stirred for 25 min., and then the temperature is adjusted to 40° C., 0.02 kg sodium persulfate is added, the nitrogen supply and the stirring are stopped, and the reaction liquid is held for 5 h for reaction; the reaction product is taken out, dried for 18 h at 90° C., and pulverized to obtain a granular intermediate product of reservoir protectant.

30 kg intermediate product and 2 kg sodium hydroxide are added into 57 kg water and the liquid is stirred continuously for 15 h, then 10 kg sodium formate and 1 kg dodecyldimethylbenzyl ammonium chloride are added, and the liquid is stirred further for 0.5 h; thus, a polymer elastic granule of the reservoir protectant A3 is obtained.

Preparation Example 4

Polymer elastic granule of the reservoir protectant A4 is prepared according to the method described in the preparation example 1, but in the method for preparing the intermediate product of the reservoir protectant, the amounts of acrylamide, dimethyldiallyl ammonium chloride, N, N'-methylene-bis acrylamide, water, sodium bentonite, and ammonium persulfate are 8 kg, 8 kg, 0.5 kg, 78.49 kg, 5 kg, and 0.01 kg respectively. Thus, a polymer elastic granule of the reservoir protectant A4 is obtained.

Preparation Example 5

Polymer elastic granule A5 is prepared according to the method described in the preparation example 1, but in the method for preparing the reservoir protectant, the amounts of the intermediate product, sodium carbonate, water, sodium chloride, and octodecyltrimethyl ammonium chloride are 6 kg, 1 kg, 88.5 kg, 3 kg, and 1.5 kg respectively. Thus, a polymer elastic granule of the reservoir protectant A5 is obtained.

Example 1

A water-based drilling fluid is prepared according to the following formulation: 3% polymer elastic granule of the reservoir protectant A1; 3% sodium bentonite (purchased from Anyang Yihe Bentonite Co., Ltd.); 1% sulfonate copolymer DSP-2 (purchased from Shandong Deshunyuan Petroleum Technology Co. Ltd.); 0.5% temperature-resistant and salinity-resistant filtrate reducer LY-1 (purchased from Shandong Deshunyuan Petroleum Technology Co., Ltd.); 0.5% sulfonated sodium tannin (purchased from Shandong Yanggu Jiangbei Chemical Co., Ltd.); 2% sulfomethylated lignite resin SPNH (purchased from Shandong Deshunyuan Petroleum Technology Co. Ltd.); 1% organic amine shale inhibitor AP-2 (purchased from Shandong Deshunyuan Petroleum Technology Co. Ltd.); 3% polyether glycol SYP-2 (purchased from Shandong Deshunyuan Petroleum Technology Co., Ltd.), and water (accounts for the remaining content). The above-mentioned percentages in the water-based drilling fluid are mass-volume ratios; for example, 3% polymer elastic granule of the reservoir protectant A1 refers to that 3 g polymer elastic granule of the reservoir protectant A1 is contained in 100 ml water-based drilling fluid.

Wherein, the method for preparing the water-based drilling fluid is as follows: the sodium bentonite is mixed with water, the mixture is stirred for 3 h and held for 24 h, and then the sulfonate copolymer DSP-2 is added into the system and stirring the system to make sulfonate copolymer DSP-2 dissolve fully; then, the temperature-resistant and salinity-resistant filtrate reducer LY-1, the sulfonated sodium tannin, sulfomethylated lignite resin SPNH, organic amine shale inhibitor AP-2, polyether glycol SYP-2, reservoir protectant A1, polyester fiber TZT-PET-6, and zero-permeability drilling fluid additive HY-3000 are added, and the mixture is stirred for 40 min.

Example 2

A water-based drilling fluid is prepared according to the method described in the example 1, but the water-based drilling fluid is prepared according to the following formulation: 2% polymer elastic granule of the reservoir protectant A2; 1% sodium bentonite (purchased from Anyang Yihe Bentonite Co., Ltd.); 0.5% sulfonate copolymer DSP-2 (purchased from Shandong Deshunyuan Petroleum Technology Co. Ltd.); 0.8% temperature-resistant and salinity-resistant filtrate reducer LY-1 purchased (from Shandong Deshunyuan Petroleum Technology Co., Ltd.); 0.8% sulfonated sodium tannin (purchased from Shandong Yanggu Jiangbei Chemical Co., Ltd.); 3% sulfomethylated lignite resin SPNH (purchased from Shandong Deshunyuan Petroleum Technology Co. Ltd.); 1.5% organic amine shale inhibitor AP-2 (purchased from Shandong Deshunyuan Petroleum Technology Co. Ltd.); 2% polyether glycol SYP-2 (purchased from Shandong Deshunyuan Petroleum Technology Co., Ltd.), and water (accounts for the remaining content).

Example 3

A water-based drilling fluid is prepared according to the method described in the example 1, but the water-based drilling fluid is prepared according to the following formulation: 4% polymer elastic granule of the reservoir protectant A3; 2% sodium bentonite (purchased from Anyang Yihe Bentonite Co., Ltd.); 0.8% sulfonate copolymer DSP-2 (purchased from Shandong Deshunyuan Petroleum Technology Co. Ltd.); 1% temperature-resistant and salinity-resistant filtrate reducer LY-1 (purchased from Shandong Deshunyuan Petroleum Technology Co., Ltd.); 1% sulfonated sodium tannin (from Shandong Yanggu Jiangbei Chemical Co., Ltd.); 4% sulfomethylated lignite resin SPNH (purchased from Shandong Deshunyuan Petroleum Technology Co. Ltd.); 2% organic amine shale inhibitor AP-2 (purchased from Shandong Deshunyuan Petroleum Technology Co. Ltd.); 2.5% polyether glycol SYP-2 (purchased from Shandong Deshunyuan Petroleum Technology Co., Ltd.), and water (accounts for the remaining content).

Example 4

A water-based drilling fluid is prepared according to the method described in the example 1, but the polymer elastic granule of the reservoir protectant A1 is replaced with polymer elastic granule of the reservoir protectant A4.

Example 5

A water-based drilling fluid is prepared according to the method described in the example 1, but the polymer elastic granule of the reservoir protectant A1 is replaced with polymer elastic granule of the reservoir protectant A5.

Comparative Example 1

A water-based drilling fluid is prepared according to the method described in the example 1, but no polymer elastic granule of the reservoir protectant is added (see Table 1 for the detailed composition), i.e., the drilling fluid is prepared according to the following formulation: 3% sodium bentonite (purchased from Anyang Yihe Bentonite Co., Ltd.); 1% sulfonate copolymer DSP-2 (purchased from Shandong Deshunyuan Petroleum Technology Co. Ltd.); 0.5% temperature-resistant and salinity-resistant filtrate reducer LY-1 (purchased from Shandong Deshunyuan Petroleum Technology Co., Ltd.); 0.5% sulfonated sodium tannin (purchased from Shandong Yanggu Jiangbei Chemical Co., Ltd.); 2% sulfomethylated lignite resin SPNH (purchased from Shandong Deshunyuan Petroleum Technology Co. Ltd.); 1% organic amine shale inhibitor AP-2 (purchased from Shandong Deshunyuan Petroleum Technology Co. Ltd.); 3% polyether glycol SYP-2 (purchased from Shandong Deshunyuan Petroleum Technology Co., Ltd.), and water (accounts for the remaining content).

Comparative Example 2

A water-based drilling fluid is prepared according to the method described in the example 1, but the polymer elastic granule of the reservoir protectant A1 is replaced with zero-permeability drilling fluid additive HY-3000 (from Hebei Huayun Hongye Chemical Co., Ltd.), and the content of the zero-permeability drilling fluid additive HY-3000 in the drilling fluid is 3%.

Comparative Example 3

A water-based drilling fluid is prepared according to the method described in the example 1, but the polymer elastic granule of the reservoir protectant A1 is replaced with calcium carbonate composition (800 mesh:400 mesh:200 mesh=1:4:6, weight ratio), and the total content of calcium carbonate in the drilling fluid is 3%.

Test Examples

The parameters involved in the present invention are measured with the following methods:
(1) Measurement of Drilling Fluid Properties
The performance parameters of the drilling fluids in the examples 1-5 and the comparative examples 1-3 at 24±3° C. temperature are measured as per GB/T 16783.1-2006. The results are shown in Table 1.
(2) Measurement of Plugging Ratio and Permeability Recovery Ratio
The reservoir protection performance is tested in a SH-1 HTHP (High Temperature And High Pressure) dynamic filtration device as per SYT 6540-2002 Lab Testing Method of Drilling and Completion Fluids Damaging Oil Formation. The dimensions of a well core is measured, the well core is vacuum-pumped and saturated with standard brine for 48 h, and then the oleic permeability $K_1$ (i.e., the initial core permeability in Table 2) is measured in the normal direction; the well core is plugged with the drilling fluids (drilling fluids in the examples 1-5 and comparative examples 1-3) in a dynamic filtration device respectively, the mud cake at the plugging end is removed after the plugging is completed, the oleic permeability $K_2$ (i.e., the core permeability after plugging in Table 2) of the well core is measured in the normal direction, and the plugging ratio is calculated $$BR = \frac{K_1 - K_2}{K_1} \times 100\%.$$

Next, the oleic permeability $K_3$ of the well core in the reversed direction (i.e., the core permeability after flow-back in Table 2) is measured, and the permeability recovery ratio is calculated $$RR = \frac{K_3}{K_1} \times 100\%.$$

The results are shown in Table 2.

TABLE 1

| | Apparent Viscosity (AV)/ (mPa · s) | Plastic Viscosity (PV)/ (mPa · s) | Yield Point (YP)/ Pa | API Filter Loss/ ml |
|---|---|---|---|---|
| Example 1 | 72 | 50 | 22 | 3.2 |
| Example 2 | 69 | 49 | 20 | 3.0 |
| Example 3 | 71 | 51 | 20 | 2.8 |
| Example 4 | 70 | 52 | 18 | 3.2 |
| Example 5 | 72 | 53 | 19 | 3.3 |
| Comparative example 1 | 70 | 51 | 19 | 3.6 |
| Comparative example 2 | 83 | 58 | 25 | 3.3 |
| Comparative example 3 | 72 | 51 | 21 | 3.4 |

It is seen from the data in Table 1: the drilling fluids that contain the zero-permeability drilling fluid additive HY-3000, polymeric elastic granular of the reservoir protectant, and calcium carbonate are lower in filtrate loss, can reduce intrusion of the filtrate of drilling fluid into the reservoir in the drilling fluid process, and are advantageous for reservoir protection.

TABLE 2

| Drilling Fluid | Initial Core Permeability $K_1$/ ($10^{-3}$ μm²) | Core Permeability after Plugging $K_2$/ ($10^{-3}$ μm²) | Core Permeability after Flow-Back $K_3$/ ($10^{-3}$ μm²) | Plugging Ratio/% | Permeability Recovery Ratio/% |
|---|---|---|---|---|---|
| Example 1 | 754.3 | 19.4 | 718.1 | 97.4 | 95.2 |
| Example 2 | 695.2 | 18.6 | 658.4 | 97.3 | 94.7 |
| Example 3 | 816.2 | 36.9 | 790.1 | 95.5 | 96.8 |
| Example 4 | 849.5 | 76.5 | 771.3 | 91.0 | 90.8 |
| Example 5 | 916 | 91.6 | 825.4 | 90.0 | 90.1 |
| Comparative example 1 | 739.5 | 180.2 | 527.3 | 75.6 | 71.3 |
| Comparative example 2 | 829.3 | 125.3 | 693.3 | 84.9 | 83.6 |
| Comparative example 3 | 747.7 | 137.5 | 586.9 | 81.6 | 78.5 |

It is seen from the data in able 2: drilling fluids that use the polymeric elastic granular of the reservoir protectant disclosed in the present invention can attain an obviously better reservoir protection effect; specifically, the plugging ratio is 90% or above, preferably is 95% or above; the permeability recovery ratio is 90% or above, preferably is 94% or above. The data indicates that the water-based drilling fluid provided in the present invention has an obvious reservoir protection effect, attains a good plugging effect, and has a unidirectional plug removal characteristic.

Furthermore, it is seen from the result of comparison between example 1 and example 4 in Table 2: in the raw materials for preparing the intermediate product of reservoir protectant, based on 100 pbw raw materials, if the dose of the acrylamide is 10-25 pbw, the dose of the cationic monomer is 2-5 pbw, the dose of the cross-linker is 0.01-0.05 pbw, the dose of the initiator is 0.02-0.05 pbw, and the dose of the toughener is 8-15 pbw, the reservoir protection capability of the drilling fluid can be further improved.

Moreover, it is seen from the result of comparison between example 1 and example 5 in Table 2: based on 100 pbw reservoir protectant, if the dose of the intermediate product is 10-30 pbw, the dose of the alkali is 2-5 pbw, and the dose of the salt is 5-10 pbw, the reservoir protection capability of the drilling fluid can be further improved.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A method for preparing a water-based fluid, comprising:
   mixing bentonite, a tackifier, a diluent, a filtrate reducer, an anti-collapse agent, a reservoir protectant, a lubricant, and water homogeneously;
   wherein the mixing comprises:
   mixing bentonite with water, adding the tackifier after 18-36 h and stirring; and
   adding the filtrate reducer, the anti-collapse agent, the lubricant, the diluent, and the reservoir protectant, and stirring for 20-40 min,
   wherein, the reservoir protectant comprises an intermediate product, an alkali, a salt, and water, and, based on 100 parts by weight (pbw) of the reservoir protectant, the amount of the intermediate product is 5-40 pbw, the amount of the alkali is 1-10 pbw, and the amount of the salt is 1-12 pbw,
   wherein the intermediate product is prepared from raw materials including acrylamide, a cationic monomer, a cross-linker, an initiator, a toughener, and water and, based on 100 pbw of the raw materials, the amount of the acrylamide is 8-30 pbw, the amount of the cationic monomer is 1-10 pbw, the amount of the cross-linker is 0.01-0.5 pbw, the amount of the initiator is 0.01-0.1 pbw, and the amount of the toughener is 5-25 pbw.

2. The method according to claim 1, wherein based on 100 pbw of the reservoir protectant, the amount of the intermediate product is 10-30 pbw, the amount of the alkali is 2-5 pbw, and the amount of the salt is 5-10 pbw.

3. The method according to claim 2, wherein the cationic monomer is at least one of dimethyldiallyl ammonium halide, methacryloyloxyethyl-trimethyl ammonium halide, acryloyloxyethyl-trimethyl ammonium halide, alkyldimethylbenzyl ammonium halide, and alkyltrimethyl ammonium halide.

4. The method according to claim 3, wherein an alkyl substituent in alkyldimethylbenzyl ammonium halide is C8-C20 alkyl, and an alkyl substituent in alkyltrimethyl ammonium halide is C8-C20 alkyl.

5. The method according to claim 1, wherein based on 100 pbw of the raw materials, the amount of the acrylamide is 10-25 pbw, the amount of the cationic monomer is 2-5 pbw, the amount of the cross-linker is 0.01-0.05 pbw, the amount of the initiator is 0.02-0.05 pbw, and the amount of the toughener is 8-15 pbw.

6. The method according to claim 1, wherein the cationic monomer is a quaternary ammonium compound; and/or the cross-linker is at least one of N, N'-methylene-bis acrylamide, divinyl benzene, and glutaraldehyde; and/or
   the initiator is persulfate; and/or
   the toughener is starch and/or bentonite; and/or
   the alkali is at least one of sodium hydroxide, potassium hydroxide, sodium carbonate, potassium carbonate, sodium bicarbonate, and potassium bicarbonate; and/or
   the salt is at least one of sodium chloride, potassium chloride, calcium chloride, sodium formate, potassium formate, and cesium formate.

7. The method according to claim 6, wherein the initiator is at least one of ammonium persulfate, potassium persulfate, and sodium persulfate.

8. The method according to claim 1, wherein the reservoir protectant further comprises a bactericide, and, based on 100 pbw of the reservoir protectant, the amount of the bactericide is 0.03-2 pb.

9. The method according to claim 8, wherein the bactericide is an absorptive bactericide.

10. The method according to claim 9, wherein the bactericide is at least one of alkyltrimethyl ammonium halide, alkylpyridinium halide, and alkyldimethylbenzyl ammonium halide.

11. The method according to claim 10, wherein an alkyl substituent in alkyltrimethyl ammonium halide is C8-C20 alkyl, an alkyl substituent in alkylpyridinium halide is C8-C20 alkyl, and an alkyl substituent in alkyldimethylbenzyl ammonium halide is C8-C20 alkyl.

12. The method according to claim 1, wherein based on 100 ml of the water-based drilling fluid, the amount of the bentonite is 0-4 g; the amount of the tackifier is 0.2-2 g; the amount of the diluent is 0.5-2 g; the amount of the filtrate reducer is 1.5-7 g; the amount of the anti-collapse agent is 0-3 g; the amount of the reservoir protectant is 1-5 g; and the amount of the lubricant is 0-5 g.

13. The method according to claim 12, wherein based on 100 ml of the water-based drilling fluid, the amount of the bentonite is 1-3 g; the amount of the tackifier is 0.5-1 g; the amount of the diluent is 0.5-1 g; the amount of the filtrate reducer is 2.5-5 g; the amount of the anti-collapse agent is 1-2 g; the amount of the reservoir protectant is 2-4 g; the amount of the lubricant is 2-3 g.

14. The method according to claim 12, wherein the bentonite is sodium bentonite and/or calcium bentonite; and/or
   the tackifier is at least one of sulfonate copolymer, potassium polyacrylamide, polyanionic cellulose, xanthan gum, sodium carboxymethylcellulose, and polyacrylamide; and/or
   the diluent is sulfonated sodium tannin and/or zwitterionic polymer viscosity reducer; and/or
   the filtrate reducer is at least one of sulfomethylated phenolic resin, lignite resin, sulfomethylated lignite resin, modified starch, temperature-resistant and salinity-resistant filtrate reducer, and zwitterionic polymer; and/or
   the anti-collapse agent is at least one of organic amine shale inhibitor, potassium humate, organic silicon, and modified asphalt; and/or
   the lubricant is at least one of graphite, mineral oil, vegetable oil, plastic beads, and polyether glycol.

15. A method of drilling a high-permeability reservoir well, the method comprising:
   applying a water-based drilling fluid, wherein the high-permeability reservoir has a permeability of 500 md or higher, wherein water-based drilling fluid is prepared by:
mixing bentonite, a tackifier, a diluent, a filtrate reducer, an anti-collapse agent, a reservoir protectant, a lubricant, and water homogeneously,
  wherein the mixing comprises:
    mixing bentonite with water, adding the tackifier after 18-36 h and stirring; and
    adding the filtrate reducer, the anti-collapse agent, the lubricant, the diluent, and the reservoir protectant, and stirring for 20-40 min,
  wherein the reservoir protectant comprises an intermediate product, an alkali, a salt, and water and, based on 100 parts by weight (pbw) of the reservoir protectant, the amount of the intermediate product is 5-40 pbw, the amount of the alkali is 1-10 pbw, and the amount of the salt is 1-12 pbw,
  wherein the intermediate product is prepared from raw materials including acrylamide, a cationic monomer, a cross-linker, an initiator, a toughener, and water, and, based on 100 pbw of the raw materials, the amount of the acrylamide is 8-30 pbw, the amount of the cationic monomer is 1-10 pbw, the amount of the cross-linker is 0.01-0.5 pbw, the amount of the initiator is 0.01-0.1 pbw, and the amount of the toughener is 5-25 pbw.

* * * * *